F. C. OTTO.
PNEUMATIC TIRE.
APPLICATION FILED MAY 15, 1916.

1,223,724.

Patented Apr. 24, 1917.

Inventor
Fred C. Otto.
By Attorneys.
Southgate & Southgate.

UNITED STATES PATENT OFFICE.

FRED C. OTTO, OF WORCESTER, MASSACHUSETTS.

PNEUMATIC TIRE.

1,223,724.

Specification of Letters Patent.   Patented Apr. 24, 1917.

Application filed May 15, 1916.   Serial No. 97,517.

*To all whom it may concern:*

Be it known that I, FRED C. OTTO, a citizen of the United States, residing at Worcester, in the county of Worcester and State of Massachusetts, have invented a new and useful Pneumatic Tire, of which the following is a specification.

The principal object of this invention is to provide a tire made up of a plurality of parts so that if any one of them is injured the tire can be restored to full working condition without replacing the entire device; and also to provide a construction in which the means for holding the parts together also serves as an anchorage for the anti-slipping chains. The invention also involves an improved manner of attaching the chains so that if one or more of them should break it will not interfere with the others in any way.

Reference is to be had to the accompanying drawings in which—

Figure 1:
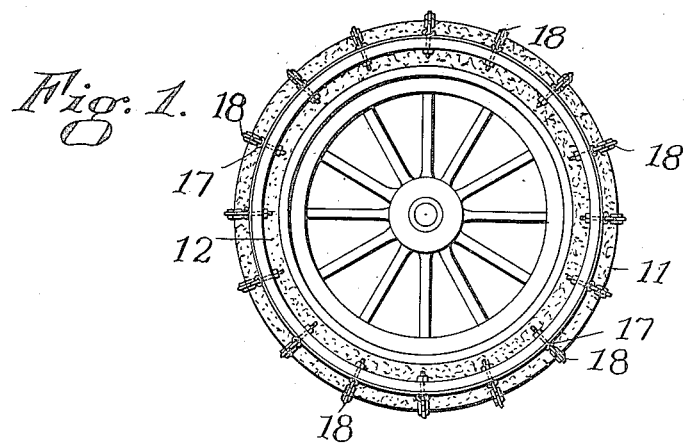
Figure 1 is a side elevation of a wheel provided with a tire constructed in accordance with this invention.
Figure 2:
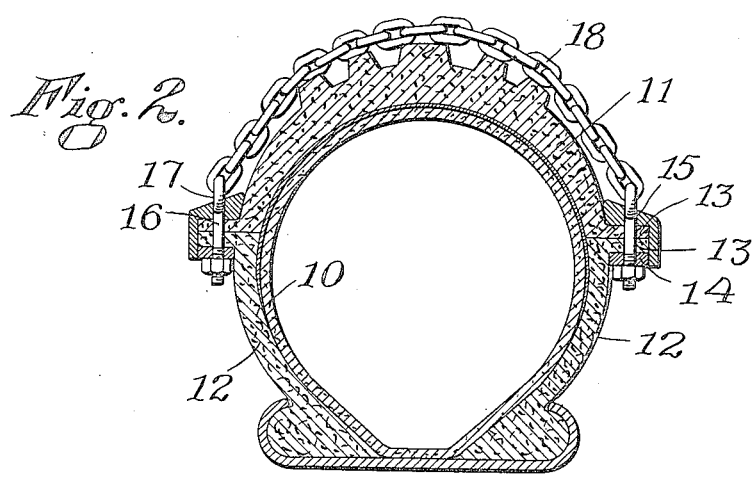
Fig. 2 is a transverse sectional view of the tire on enlarged scale.

Referring first to Figs. 1 and 2, the invention is shown as being used with the usual inner tube 10. The outer tube consists of three parts, the tread part 11 and two side members 12, all of rubber or the like. Each of the members 11 and 12 is provided with a flange as 13. These flanges extend entirely around the tire and are located near the point at which the inner tube is at its greatest width but preferably slightly beyond this point. The parts 11 and 12 are in contact with each other along a cylindrical surface which extends clear to their inner edges so as to prevent a gap appearing in which the inner tube could be pinched.

For the purpose of securing the parts together two metal rings 14 and 15 are shown, the ring 14 being a plain cylindrical one and the ring 15 being L-shaped in cross section and having one of its flanges triangular in cross section as indicated. The circular flange on this ring extends beyond the flanges 13 and into contact with the ring 14 so as to help hold them in position.

The rings are secured together at intervals through the flanges 13 by means of bolts 16, these bolts being secured by nuts or in any other desired way. Each bolt is provided with an eye 17 which sinks into a slot in the outer edge of the ring 15 which holds it from turning. These eyes receive the end links of a series of anti-slipping members shown as chains 18. These links may be secured in position permanently as indicated in Fig. 2 or by means of snap hooks 19 as indicated in Fig. 3.

Figure 3:
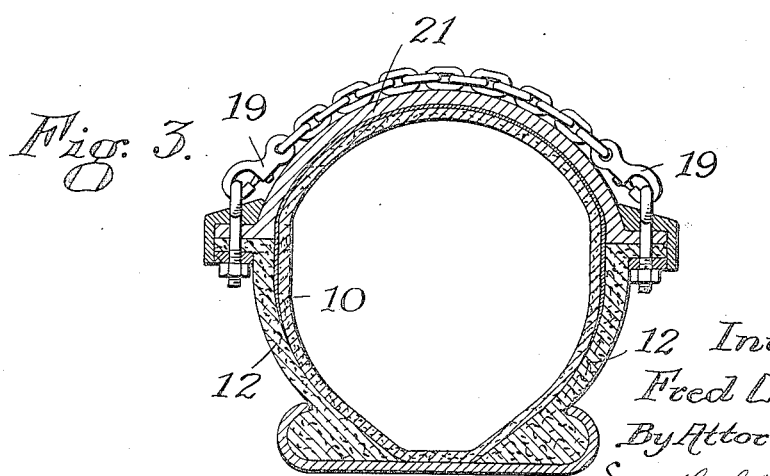
Fig. 3 is a similar view showing a modification.

In the form of the invention shown in Fig. 3 the parts are all the same as above described, except that the member 21 which constitutes the tread is made of metal and consequently is thinner than the tread portion 11 in the other figures, but in this case the parts 12 are of the same construction.

When made in the forms shown or in any equivalent thereto the device possesses several advantages. If the tread portion 11 is injured it is not necessary to throw away the whole tire but only the injured part and of course the same is true of the side members 12. In the form shown in Fig. 3 the tread portion is practically indestructible by ordinary wear.

By anchoring the chains 18 at their two ends to the rings each chain is independent of the others and if one is broken it does not loosen the others in any way. Furthermore the chains can be removed readily by taking out the bolts if they are secured as shown in Fig. 2, and still more easily in the form shown in Fig. 3. The chains are practically secured to the side members 12 so as to take some of the strain off the tread member by helping to transmit it to the rim.

Although I have illustrated and described only two forms of the invention I am aware of the fact that other modifications can be made therein by any person skilled in the art without departing from the scope of the invention as expressed in the claims. Therefore, I do not wish to be limited to all the details of construction herein shown and described, but What I do claim is:—

1. As an article of manufacture, a tire made up of a plurality of members having outwardly extending flanges at their meeting edges, separated metal rings located on the outer surfaces of said flanges, one of said rings having a flange extending beyond the edge of the other ring, and means for holding the rings and flanges together.

2. As an article of manufacture, a tire comprising side members and a tread member, each of said side members having an outwardly extending flange, and the tread member having two oppositely extending flanges contacting with the flanges of the side members, metallic rings on opposite sides of the flanges for helping to hold the parts together, one of said rings having a circular extension extending beyond the edge of the other ring for holding the same in position and means for holding the rings and flanges together.

3. As an article of manufacture, a tire comprising side members and a tread member, each of said side members having an outwardly extending cylindrical flange, and the tread member having two oppositely extending cylindrical flanges, bolts extending through said flanges, and two independent rings on opposite sides of the flanges for engaging the bolts and helping to hold the parts together.

4. As an article of manufacture, a tire comprising side members and a tread member, each of said side members having an outwardly extending circular flange, and the tread member having two oppositely extending circular flanges contacting with the flanges of the side members, bolts extending through said flanges, and metallic rings on opposite sides of the flanges for engaging the bolts and helping to hold the parts together, one of said rings having a circular extension against which the ends of the flanges abut and extending beyond the edge of the other ring for holding the same in position.

In testimony whereof I have hereunto set my hand.

FRED C. OTTO.